(12) United States Patent
Halberg et al.

(10) Patent No.: US 11,744,237 B1
(45) Date of Patent: Sep. 5, 2023

(54) ICE FISHING CONTAINER AND ORGANIZER SYSTEM THEREFOR

(71) Applicant: F&H Design, LLC., Shevlin, MN (US)

(72) Inventors: Timothy W. Halberg, Shevlin, MN (US); Martin T. Feil, Shevlin, MN (US)

(73) Assignee: F&H Design, LLC., Shevlin, MN (US)

( * ) Notice: Subject to any disclaimer, the term of this patent is extended or adjusted under 35 U.S.C. 154(b) by 659 days.

(21) Appl. No.: 16/710,493

(22) Filed: Dec. 11, 2019

Related U.S. Application Data

(60) Provisional application No. 62/793,194, filed on Jan. 16, 2019.

(51) Int. Cl.
*A01K 97/01* (2006.01)
*B62B 15/00* (2020.01)
*A01K 97/06* (2006.01)

(52) U.S. Cl.
CPC ............... *A01K 97/01* (2013.01); *A01K 97/06* (2013.01); *B62B 15/007* (2013.01)

(58) Field of Classification Search
CPC ......... A01K 97/01; A01K 97/06; A01K 97/08; A01K 97/04; B62B 15/007; B62B 15/00; B62B 13/06; B65D 25/06; B65D 25/04; B65D 25/10; B65D 2501/2421; B65D 2501/24216
USPC ............... 220/544, 533, 532, 529; 280/28.12
See application file for complete search history.

(56) References Cited

U.S. PATENT DOCUMENTS

| | | | | | |
|---|---|---|---|---|---|
| 1,585,575 | A | * | 5/1926 | Van Husan | B62B 13/06 280/28.12 |
| 3,304,645 | A | * | 2/1967 | Hardesty et al. | A01K 63/02 43/55 |
| 3,477,165 | A | * | 11/1969 | Brancato | A01K 97/05 43/55 |
| D260,141 | S | * | 8/1981 | West | D12/9 |
| 4,438,940 | A | * | 3/1984 | Hunt | B62B 15/00 135/901 |
| 4,456,272 | A | * | 6/1984 | Kroeger | B62B 13/00 52/36.2 |
| 4,730,569 | A | * | 3/1988 | Colson | B62B 15/00 280/28.12 |
| 4,829,699 | A | * | 5/1989 | Perkins | A01K 97/06 43/57.1 |
| 4,996,790 | A | * | 3/1991 | Ruggles | A01K 97/05 43/55 |
| 5,148,942 | A | * | 9/1992 | Snook | B65D 25/06 206/561 |
| 5,163,694 | A | * | 11/1992 | Reichek | A01K 97/06 280/79.2 |

(Continued)

*Primary Examiner* — Timothy D Collins
*Assistant Examiner* — Maria E Graber
(74) *Attorney, Agent, or Firm* — Hamre, Schumann, Mueller & Larson, P.C.

(57) ABSTRACT

An ice fishing container and an organizer system that is useable with the ice fishing container to organize the contents within the ice fishing container. The organizer system is disposed within the interior space of the ice fishing container and is configured to neatly organize ice fishing gear and equipment within the interior space of the ice fishing container. The organizer system has a plurality of divider panels that are configured to fit within the interior space, where the divider panels of the organizer system include a plurality of longitudinal divider panels that are parallel to the side walls of the ice fishing container, and a plurality of lateral divider panels that are parallel to the front and rear end walls of the ice fishing container.

19 Claims, 12 Drawing Sheets

(56) References Cited

U.S. PATENT DOCUMENTS

| | | | | |
|---|---|---|---|---|
| D339,842 S * | 9/1993 | Spiczka | | D22/134 |
| 5,251,921 A * | 10/1993 | Daniels | | B62B 13/00 |
| | | | | 220/523 |
| 5,295,742 A * | 3/1994 | Knutson | | B25H 3/023 |
| | | | | 108/43 |
| D375,781 S * | 11/1996 | Caldwell | | D22/134 |
| 6,014,833 A * | 1/2000 | Benavidez | | A01K 97/06 |
| | | | | 206/315.11 |
| 6,467,779 B1* | 10/2002 | Mills | | B62B 1/10 |
| | | | | 280/30 |
| 6,959,811 B1* | 11/2005 | Hoover | | B65D 25/06 |
| | | | | 206/315.11 |
| 7,363,936 B1 | 4/2008 | Simoneaux et al. | | E03C 1/186 |
| | | | | 4/251.1 |
| 9,487,225 B1* | 11/2016 | Looman | | B62B 15/007 |
| 10,272,976 B1* | 4/2019 | Newhall et al. | | A47G 23/0241 |
| 2005/0051444 A1* | 3/2005 | Hurt et al. | | A01K 97/06 |
| | | | | 206/315.11 |
| 2006/0053681 A1* | 3/2006 | Hoover | | A01K 97/06 |
| | | | | 43/54.1 |
| 2007/0011939 A1* | 1/2007 | Sakai | | A01K 97/06 |
| | | | | 43/54.1 |
| 2007/0035095 A1* | 2/2007 | Mehtonen | | B62B 15/00 |
| | | | | 280/19.1 |
| 2007/0062839 A1* | 3/2007 | Patterson | | B25H 3/02 |
| | | | | 206/523 |
| 2009/0045708 A1* | 2/2009 | Dominique | | B65D 25/06 |
| | | | | 312/301 |
| 2009/0146387 A1* | 6/2009 | Klein | | A22B 7/006 |
| | | | | 280/30 |
| 2013/0277927 A1* | 10/2013 | Harvey | | B62B 15/007 |
| | | | | 280/19 |
| 2014/0165450 A1* | 6/2014 | London et al. | | A01K 97/06 |
| | | | | 43/54.1 |
| 2014/0373429 A1* | 12/2014 | Kurowski | | B62B 13/043 |
| | | | | 43/54.1 |
| 2015/0084291 A1* | 3/2015 | Yoder et al. | | B62B 15/008 |
| | | | | 280/8 |
| 2015/0342168 A1* | 12/2015 | Helms | | A01K 97/01 |
| | | | | 43/54.1 |
| 2017/0050664 A1* | 2/2017 | Raymond | | B62B 17/063 |
| 2017/0107044 A1* | 4/2017 | Resurreccion, Jr. et al. | | |
| | | | | B65D 81/3453 |
| 2017/0282661 A1* | 10/2017 | Butler | | B60F 3/0007 |
| 2018/0007882 A1* | 1/2018 | Langley et al. | | A01K 97/06 |
| 2018/0007884 A1* | 1/2018 | Langley et al. | | B65D 43/12 |
| 2018/0015883 A1* | 1/2018 | Loew | | B65D 25/06 |
| 2019/0135324 A1* | 5/2019 | Shervey | | B62B 13/06 |
| 2019/0316290 A1* | 10/2019 | Denha | | D06F 95/002 |
| 2020/0122766 A1* | 4/2020 | Cunningham et al. | | B62B 15/007 |
| 2021/0031979 A1* | 2/2021 | Feurer | | B65D 25/08 |
| 2021/0221563 A1* | 7/2021 | Chungu | | F25D 23/069 |

\* cited by examiner

*Fig.* 6

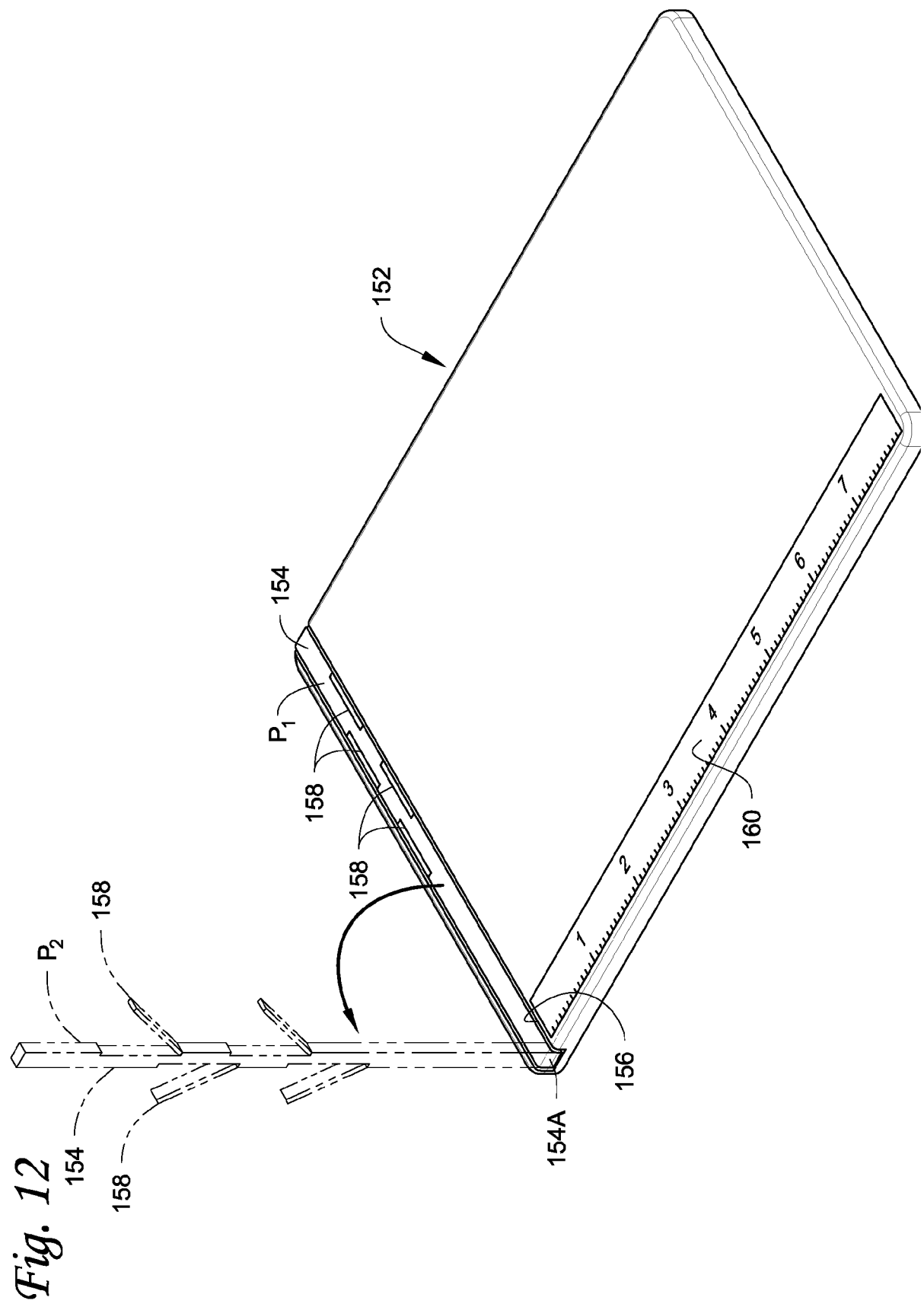

ICE FISHING CONTAINER AND ORGANIZER SYSTEM THEREFOR

FIELD

This technical disclosure describes an ice fishing container and an organizer system used with the ice fishing container to organize contents within the ice fishing container.

BACKGROUND

The use of ice fishing containers to haul ice fishing gear and equipment is well known. Many types of ice fishing containers are available. Regardless of the type of ice fishing container, during use the user typically just piles their ice fishing gear and equipment haphazardly within the container.

SUMMARY

An ice fishing container and an organizer system that is useable with the ice fishing container to organize the contents within the ice fishing container are described herein. The organizer system is disposed within the interior space of the ice fishing container and is configured to neatly organize ice fishing gear and equipment within the interior space of the ice fishing container.

The organizer system includes a plurality of divider panels that are configured to fit within the interior space, where the divider panels of the organizer system include a plurality of longitudinal divider panels that are parallel to the side walls of the ice fishing container, and a plurality of lateral divider panels that are parallel to the front and rear end walls of the ice fishing container.

The ice fishing container may be referred to as an ice fishing sled, an ice fishing utility trailer, or an ice fishing tub. In one specific embodiment, the ice fishing container can be an ice fishing sled that is configured to slide on snow and/or ice while being towed.

In one embodiment, one or more of the side walls of the ice fishing container are angled from vertical. In such an embodiment, an end of a divider panel of the organizer system that is adjacent to or faces one of the angled side walls is suitably configured to also be angled to generally match the angle of the angled side wall.

In one embodiment, the upper edges of the divider panels of the organizer system are recessed below the top of the side and end walls of the ice fishing container. This permits a lid to fit on the ice fishing container with the lid being generally flush with the top surfaces of the side and end walls of the ice fishing container. Alternatively, the lid can fit over the upper edges of the side walls of the ice fishing container.

In another embodiment, the divider panels of the organizer system may be removably mounted within the interior space of the ice fishing container to allow removal of any one of, or even all of, the divider panels. In addition, the divider panels of the organizer system may be adjustably mounted to allow the positions of the longitudinal divider panels and/or the lateral divider panels to be shifted in position within the interior space to allow user reconfiguration of the organization system. The divider panels may also be configured to allow the length of any of the longitudinal divider panels and/or the lateral divider panels to be adjusted.

The divider panels may also be configured to accommodate specific ice fishing equipment. For example, upper edges of two of the lateral divider panels may have aligned concave recesses to accommodate the shaft and/or screw of an ice auger. In another example, two or more of the lateral divider panels may have a plurality of aligned, laterally spaced holes to accommodate ice fishing poles each of which extend through a pair of the aligned holes in the lateral divider panels.

DRAWINGS

FIG. 12 is a top prospective view of the lid of FIG. 11.

DETAILED DESCRIPTION

Figure 1:
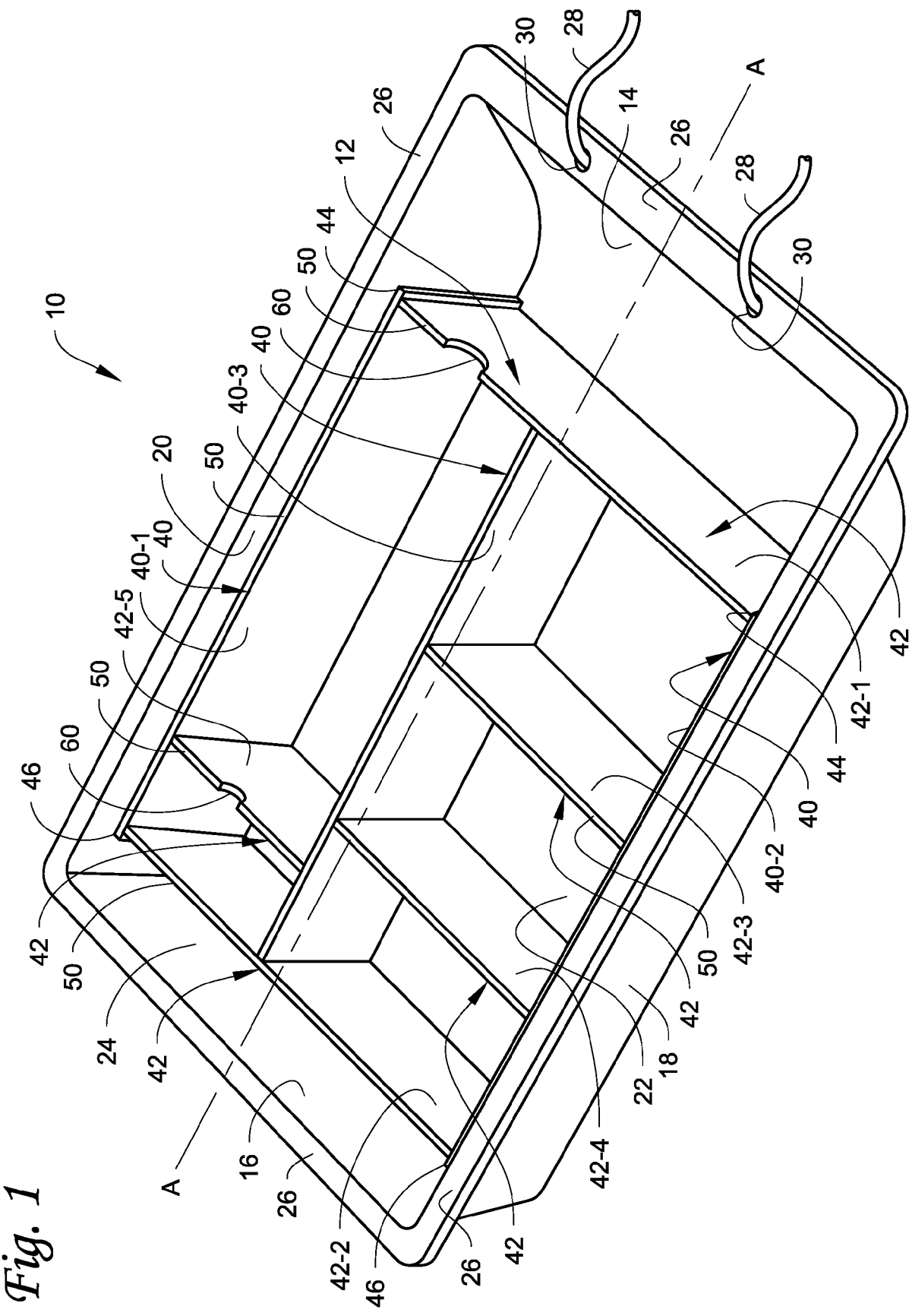
FIG. 1 is a perspective view of one embodiment of an ice fishing container in the form of an ice fishing sled and organizer system described herein.

Referring initially to FIG. 1, an embodiment of an ice fishing container 10 having one embodiment of an organizer system 12 are illustrated. In this example, the ice fishing container 10 is illustrated as being an ice fishing sled that is configured to slide on snow and/or ice while being towed either manually by a person or mechanically for example by a 4-wheeler, snowmobile, an all-terrain vehicle, an automobile, or the like. In other embodiments, the ice fishing container 10 may be an ice fishing utility trailer or an ice fishing tub. For example, an ice fishing utility trailer can include at least a pair of wheels (not shown) on which the utility trailer rolls along the ground, snow and/or ice while being towed either mechanically, for example by a 4-wheeler, a snowmobile, an all-terrain vehicle, an automobile, or even possibly manually. An ice fishing tub is configured to be hauled on/in a vehicle (not shown) such as a 4-wheeler, a snowmobile, an all-terrain vehicle, an automobile, a trailer (not shown), etc. between locations and can be offloaded once at a desired location. The ice fishing container 10 can be used in outdoor activities other than ice fishing. Such outdoor activities can include, for example, hunting, trapping, camping, farming, etc. Accordingly, the container 10 is not limited to uses associated with ice fishing. The container 10 can be configured to be used for multiple outdoor activities. In some embodiments, the container 10 can be configured to haul outdoor equipment, such as hunting rifle(s), traps, camping equipment, farm part(s), winter clothing, etc. In one embodiment, the container can be a utility trailer, for example a general purpose trailer for hauling equipment or other materials. For sake of convenience in describing the inventive concepts, the ice fishing container 10 will hereinafter be referred to as an ice fishing sled 10 or just sled 10. However, it is to be realized that the concepts described herein are not necessarily limited to an ice fishing sled unless explicitly indicated in the claims.

In the illustrated example in FIG. 1, the ice fishing sled 10 has a front end wall 14, a rear end wall 16, a first side wall 18 extending between the front end wall 14 and the rear end wall 16, a second side wall 20 extending between the front end wall 14 and the rear end wall 16, and a bottom wall 22. The walls 14, 16, 18, 20, 22 form a generally closed structure that is open at its top, and define an interior space 24 in which the organizer system 12 is disposed. A lip or flange 26 extends around the entire perimeter of the ice fishing sled 10 at the upper ends of the walls 14, 16, 18, 20, 22. The ice fishing sled 10 is made of any material that is suitable for forming the sled 10 including plastic, metal, and/or wood.

The ice fishing sled 10 (or just sled 10) can have a generally rectangular shape with a longitudinal axis A-A. In the illustrated embodiment, the first and second side walls 18, 20 are parallel to the longitudinal axis A-A, and the front end wall 14 and the rear end wall 16 are perpendicular to the longitudinal axis A-A. However, the walls 14, 16, 18, 20, 22 can have other shapes and need not be straight from one end to the other.

Still referring to FIG. 1, the front end wall 14 forms the leading end of the sled 10. The front end wall 14 is disposed at a relatively large angle relative to vertical to allow the container 10 to better travel over snow and ice when the sled 10 is being towed, for example by a tow vehicle (not shown) such as a snowmobile, an all-terrain vehicle, an automobile, or the like, or manually by a person. The lip 26 at the front end wall 14 is provided with a suitable mechanism to permit connection of a tow rope or cable 28 to the sled 10. The mechanism can be any structure(s) suitable for connecting the tow rope or cable 28 to the sled 10. For example, the mechanism can be a pair of holes 30 formed in the lip 26 as illustrated in FIG. 1, the mechanism can be protrusions formed on the lip 26 that the tow rope or cable 28 engages with, or the like.

The rear end wall 16 forms the trailing end of the sled 10. The rear end wall 16 can be disposed substantially vertically or the rear end wall 16 may be disposed at a relatively small (i.e. a smaller angle than the front end wall 14) outward angle relative to vertical.

The first and second side walls 18, 20 form the lateral sides of the sled 10. The side walls 18, 20 are illustrated as being identical to one another, however the side walls 18, 20 may have different constructions. Each one of the side walls 18, 20 can be disposed at a relatively small (i.e. a smaller angle than the front end wall 14) outward angle relative to vertical.

The bottom wall 22 forms the bottom surface of the sled 10 that is intended to slide along the snow and/or ice when the sled 10 is being towed.

Figure 10:
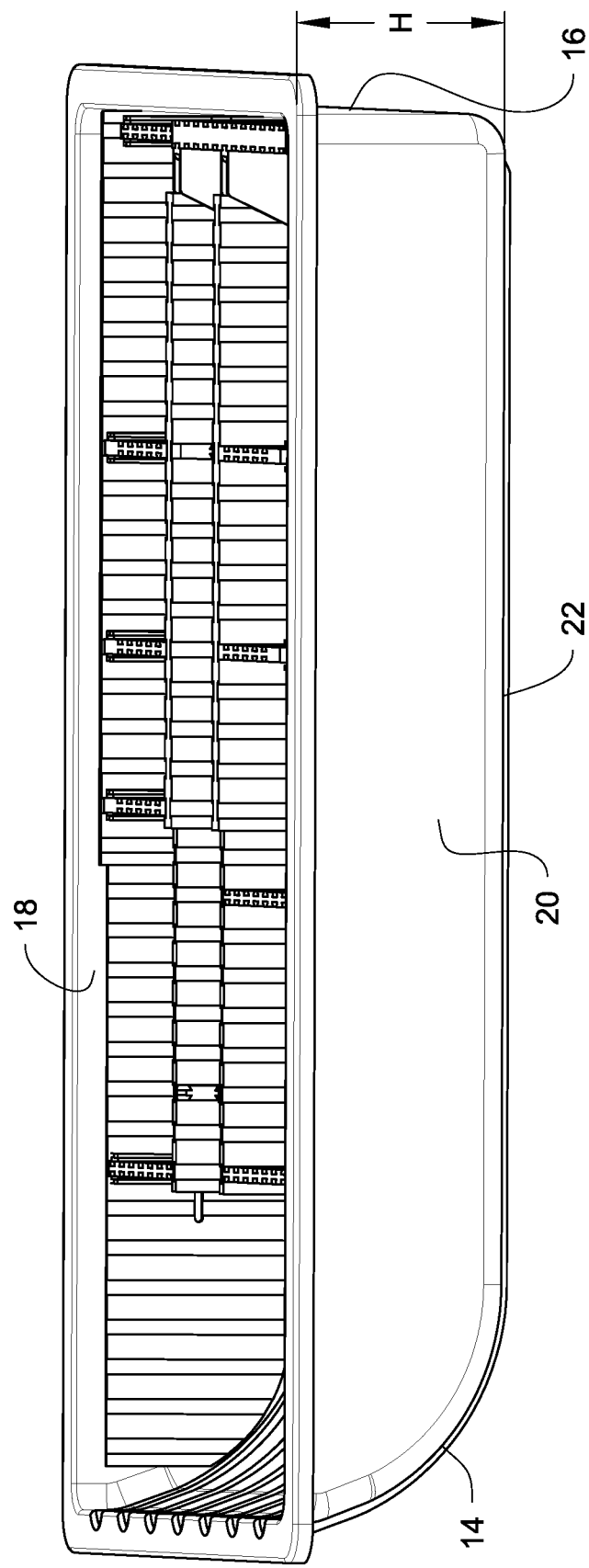
FIG. 10 is an upper side perspective view of the ice fishing sled and organizer system of FIG. 3.

With reference to FIGS. 1 and 10, the walls 14, 16, 18, 20 are illustrated as having substantially the same heights so that the height H of the sled 10 is the same at the front, the middle, and the rear of the sled 10. Alternatively, in some embodiments, the height of the side walls 18, 20 may vary from the height of the front and rear end walls 14, 16, and the height of the side walls 18, 20 may also vary along their length. The height of the front and end walls 14, 16 may also vary from one another, and may also vary along their length.

Returning to FIG. 1, the organizer system 12 is disposed within the interior space 24. In the illustrated embodiment, the organizer system 12 is completely disposed within the interior space 24 so that no portion of the organizer system 12 extends above the top surface of the sled 10. However, in other embodiments, portions of the organizer system 12 may project above the top surface of the sled 10.

The organizer system 12 includes a plurality of divider panels that are configured to fit within the interior space 24 and divide the interior space into compartments. The divider panels include a plurality of longitudinal divider panels 40 that extend parallel to the first and second side walls 18, 20, and a plurality of lateral divider panels 42 that extend parallel to the front and rear end walls 14, 16 and extend perpendicular to the longitudinal divider panels 40. In the following description, specific individual ones of the longitudinal divider panels 40 and the lateral divider panels 42 will be referenced using either the numeral 40 or 42 together with -1, -2, etc. denoting each individual panel. The divider panels 40, 42 can made of any material that is suitable for performing the functions of the divider panels 40, 42 including plastic, metal, or wood.

In the example illustrated in FIG. 1, the longitudinal divider panels 40 include a pair of the panels 40-1, 40-2 of substantially equal lengths that are parallel to the longitudinal axis A-A and that are disposed closely adjacent to and in contact with the interior surfaces of the side walls 18, 20. Since the interior surfaces of the sled 10 are substantially smooth, the panels 40-1, 40-2 provide a location for one or more lateral ends of the lateral divider panels 42 to be secured to. In this example, the panels 40-1, 40-2 do not extend the entire length of the interior space 24. Instead, forward ends 44 of the panels 40-1, 40-2 stop approximately where the slope of the front end wall 14 begins, and rearward ends 46 of the panels 40-1, 40-2 stop short of the rear end wall 16. The example in FIG. 1 also illustrates one of the panels 40-3 at the center of the sled 10 and parallel to the longitudinal axis A-A, having the forward end 44 and the rearward end 46, and having a length substantially equal to the panels 40-1, 40-2.

In addition, in the example illustrated in FIG. 1, the lateral divider panels 42 include the panels 42-1, 42-2, 42-3, 42-4 and 42-5. The panels 42-1, 42-2 extend laterally between the forward ends 44 and the rearward ends 46 of the panels 40-1, 40-2 perpendicular to the longitudinal axis A-A and perpendicular to the panels 40-1, 40-2. The panels 42-3, 42-4 are short panels that extend between, and are secured to, the panels 40-2, 40-3 at spaced locations and that are perpendicular to the longitudinal axis A-A and perpendicular to the panels 40-2, 40-3. The panel 40-5 is also a short panel that extends between, and is secured to, the panels 40-1, 40-3 and is also perpendicular to the longitudinal axis A-A and perpendicular to the panels 40-1, 40-3.

The panels 40, 42 are secured to one another by suitable securing features. For example, the panels 40, 42 may be secured together using bolts, screws, hook and loop fasteners, or other mechanical fasteners, using adhesive, or by a non-fastener type interlocking system such as slots as described below with respect to FIGS. 2-10. As discussed further below with respect to FIGS. 2-10, all of the divider panels 40, 42 may be removably secured to one another to allow changes in the positions of all of the panels 40, 42 and therefor permit reconfiguration of the layout of the divider panels 40, 42.

As depicted in FIG. 1, the panels 40, 42 all have approximately the same height as one another so that upper edges 50 of the divider panels 40, 42 are all at approximately the same level. In addition, the upper edges 50 are recessed below the top of the side walls 18, 20 and the end walls 14, 16 of the sled 10. This permits a lid to fit on the sled 10 with the lid resting on and being supported by the upper edges 50 of the panels 40, 42, so that the lid is recessed within the sled 10. In one embodiment, the lid may be recessed to such an extent that a top surface of the lid is generally flush with the top surfaces of the end walls 14, 16 and the side walls 18, 20 of the sled 10.

Returning to FIG. 1, the divider panels 40, 42 may also be configured to accommodate specific ice fishing equipment. For example, the upper edges 50 of the panels 42-1, 42-5 may have aligned concave recesses 60 to accommodate the shaft and/or screw of an ice auger, a hunting rifle, etc.

The panels 40, 42 of the organizer system 12 in FIG. 1 form a plurality of discrete compartments into which ice fishing equipment can be disposed to thereby neatly arrange, organize, and secured the equipment in the sled 10. A lid, if used and when placed into position, closes the tops of the compartments to help retain the equipment in the compartments. When mounted into position on the sled 10, the lid may also form a platform upon which one may sit or sleep, or place other equipment.

Figure 2:
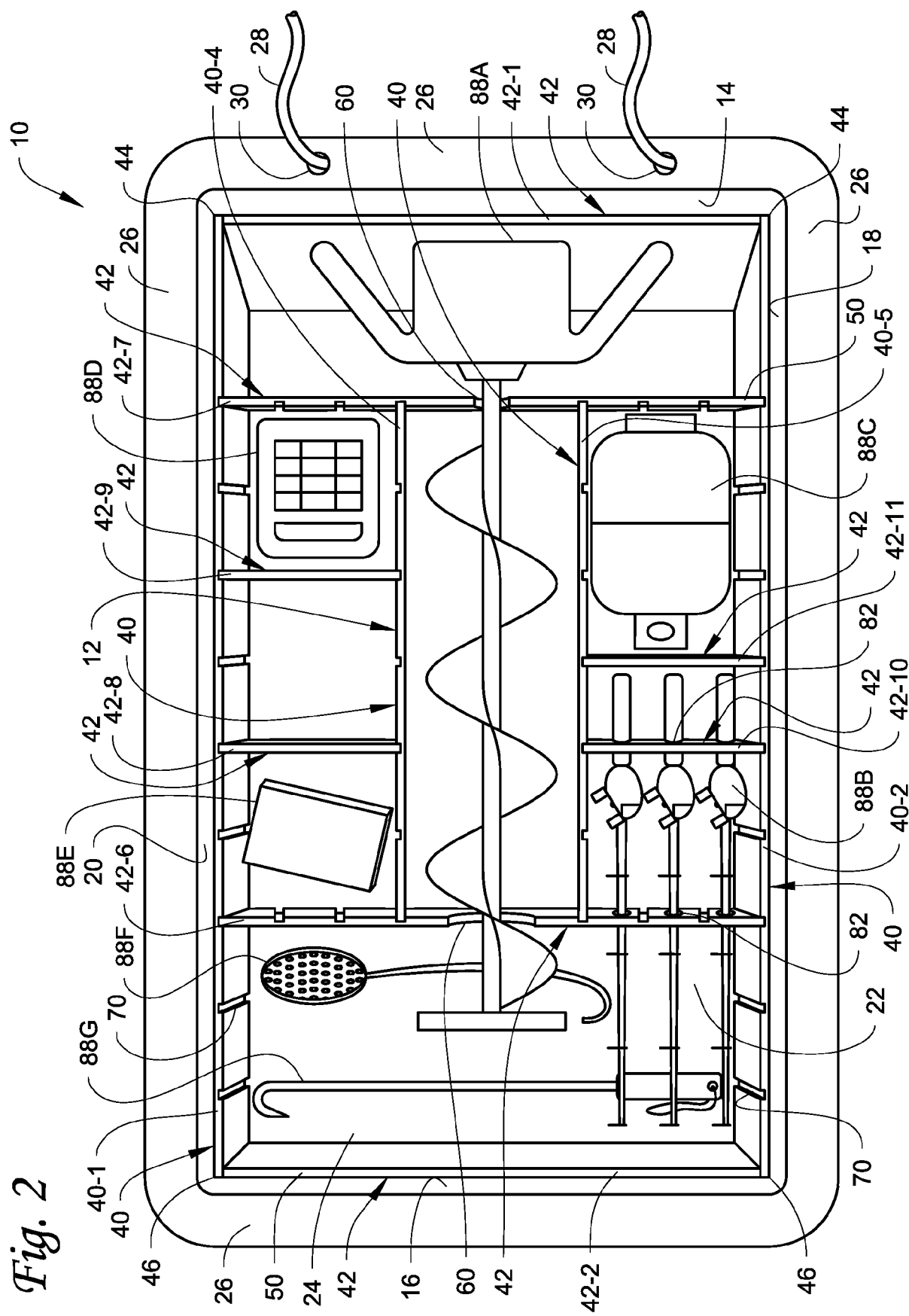
FIG. 2 is a top perspective view of the ice fishing sled of FIG. 1 with another embodiment of an organizer system described herein.

FIG. 2 is a top perspective view of the sled 10 of FIG. 1 with another embodiment of the organizer system 12. In this embodiment, there is a different arrangement of the longitudinal divider panels 40 and the lateral divider panels 42. In the example illustrated in FIG. 2, the panels 40-1, 40-2 extend substantially the entire length of the sled 10 from the front end wall 14 to the rear end wall 16. The panels 40-1, 40-2 are formed with a plurality of spaced, vertical slots or channels 70 that removably receive the lateral ends of select ones of the divider panels 42. Similarly, longitudinal divider panels 40-4, 40-5 also include a plurality of spaced, vertical slots or channels 70 that removably receive the lateral ends of select ones of the divider panels 42. The channels 70 can extend the entire height of each panel 40-1, 40-2, 40-4, 40-5. The channels 70 are non-horizontal as they do not extend directly horizontal. The channels 70 are also horizontally spaced apart. The channels 70 are sized and configured to slidably receive the lateral ends of the divider panels 42 to retain the lateral ends of the divider panels 42 and thereby fix the divider panels 42 in position. The divider panels 42 can be removed by sliding the divider panels 42 vertically upward until the lateral ends are no longer in the channels 70, and the panels 42 can then be re-positioned to a desired location by sliding the lateral ends of the panels 42 into a new pair of channels 70.

In this example, the panels 40-1, 40-2 are of substantially equal length, and the panels 40-4, 40-5 are also of substantially equal length. When the panels 40 are properly positioned, the channels 70 on the panels 40-1, 40-2, 40-4, 40-5 are substantially aligned with one another so that the divider panels 42 are substantially perpendicular to the panels 40 when the panels 42 are installed in the channels 70.

The lateral divider panels 42 include the panels 42-1, 42-2, 42-6, 42-7, 42-8, 42-9, 42-10 and 42-11. As in FIG. 1, the panels 42-1, 42-2 in FIG. 2 extend laterally between the forward ends 44 and the rearward ends 46 of the panels 40-1, 40-2 perpendicular to the longitudinal axis A-A and perpendicular to the panels 40-1, 40-2. The panels 42-6, 42-7 are long panels that extend laterally the entire distance between the panels 40-1, 40-2. The panels 42-8, 42-9 are short panels that extend between, and are secured to, the panels 40-1, 40-40-4 at spaced locations and that are perpendicular to the longitudinal axis A-A and perpendicular to the panels 40-1, 40-4. The panels 40-10, 42-11 are also short panels that extends between, and are secured to, the panels 40-2, 40-5 and are also perpendicular to the longitudinal axis A-A and perpendicular to the panels 40-2, 40-5.

As depicted in FIG. 2, the panels 40, 42 all have approximately the same height as one another so that upper edges 50 of the divider panels 40, 42 are all at approximately the same level. In addition, the upper edges 50 are recessed below the top of the side walls 18, 20 and the end walls 14, 16 of the sled 10. This permits a lid to fit on the sled 10 with the lid resting on and being supported by the upper edges 50 of the panels 40, 42, so that the lid is recessed within the interior space 24 of the sled 10. In one embodiment, the lid may be recessed to such an extent that a top surface of the lid is generally flush with the top surfaces of the end walls 14, 16 and the side walls 18, 20 of the sled 10.

Figure 4:
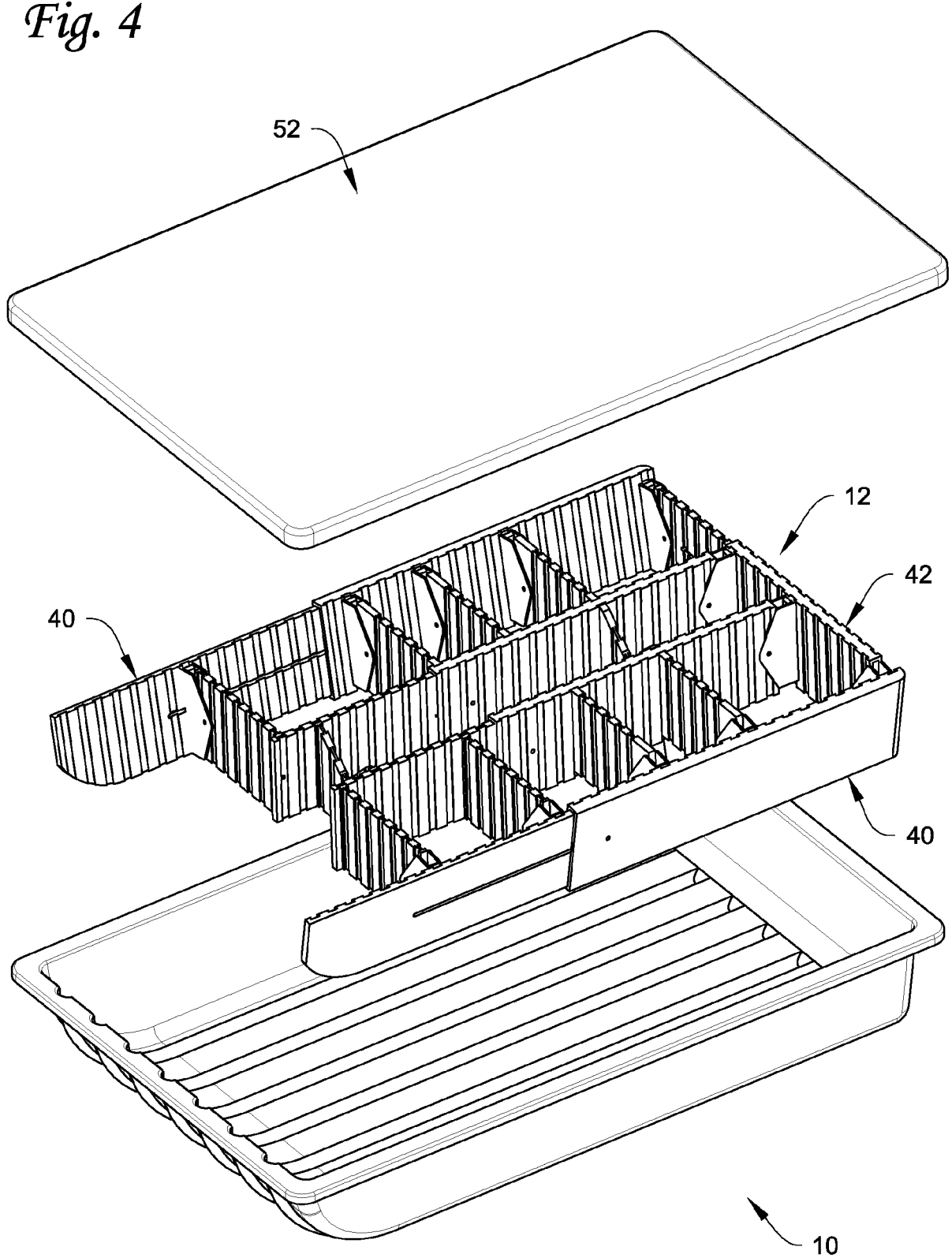
FIG. 4 is a view of the organizer system of FIG. 3 with the organizer system removed from the ice fishing sled.
Figure 5:
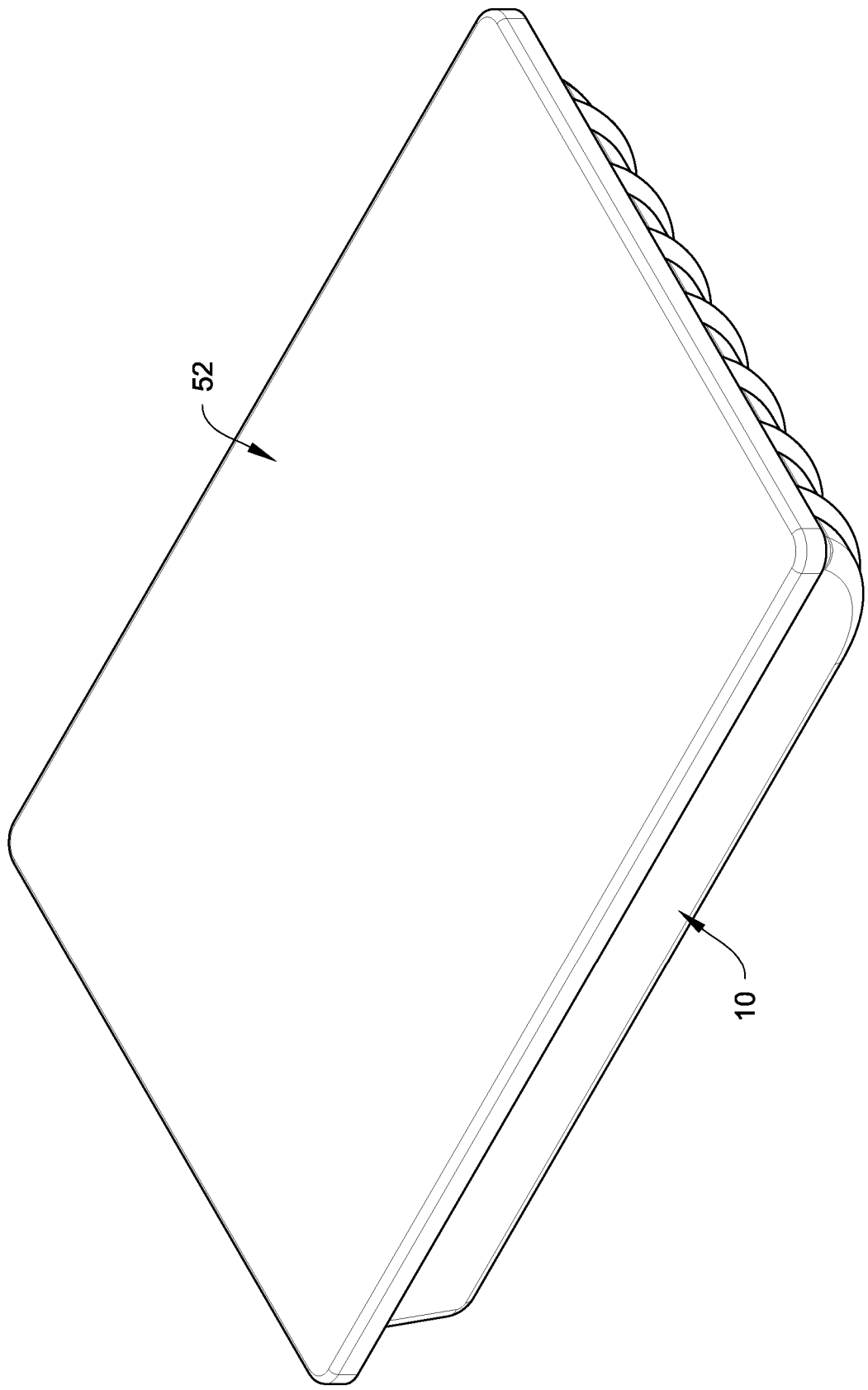
FIG. 5 illustrates the ice fishing sled of FIG. 3 with the lid in place.
Figure 6:
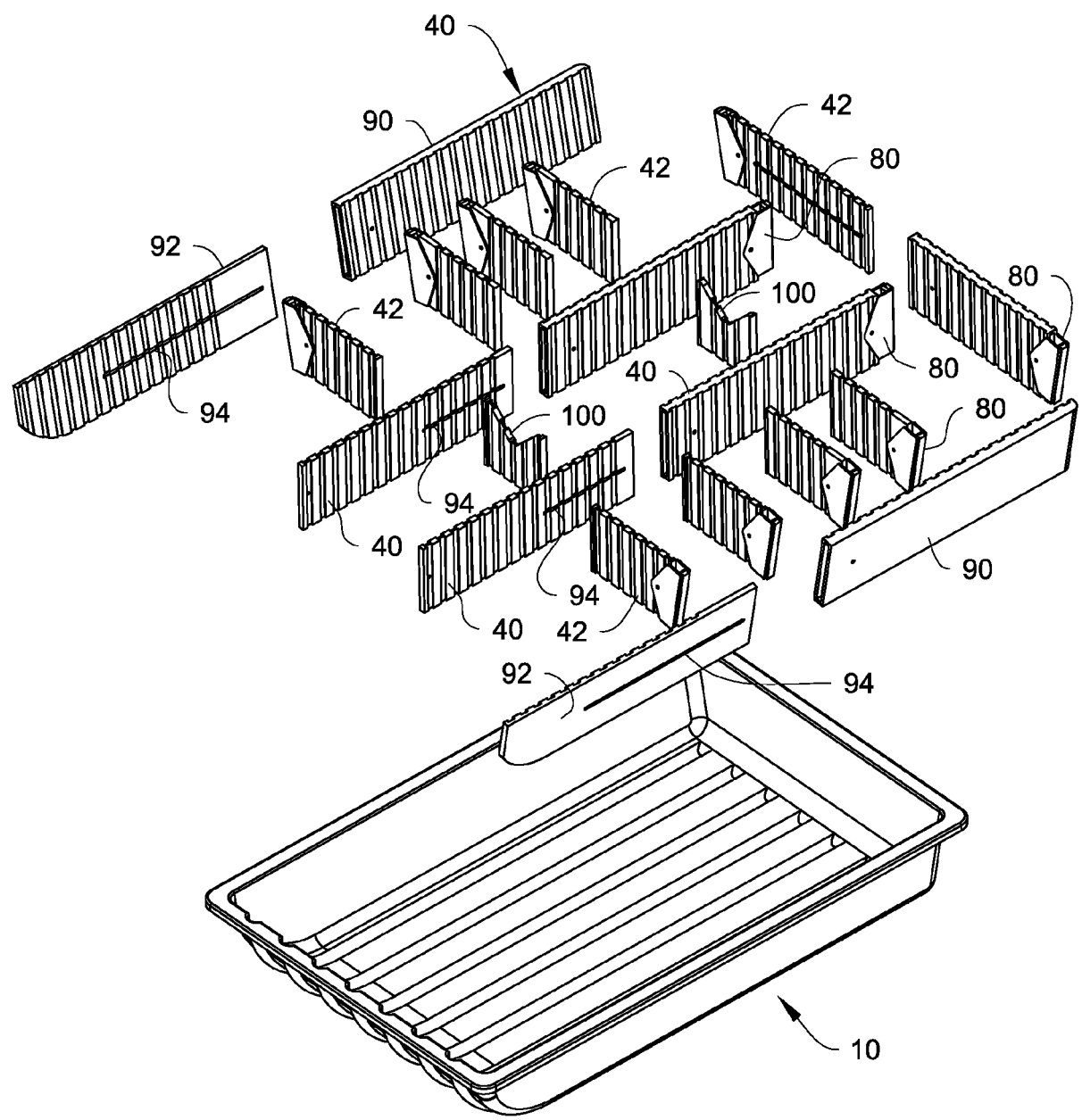
FIG. 6 is an exploded view of the components of the organizer system of FIG. 3.
Figure 7:
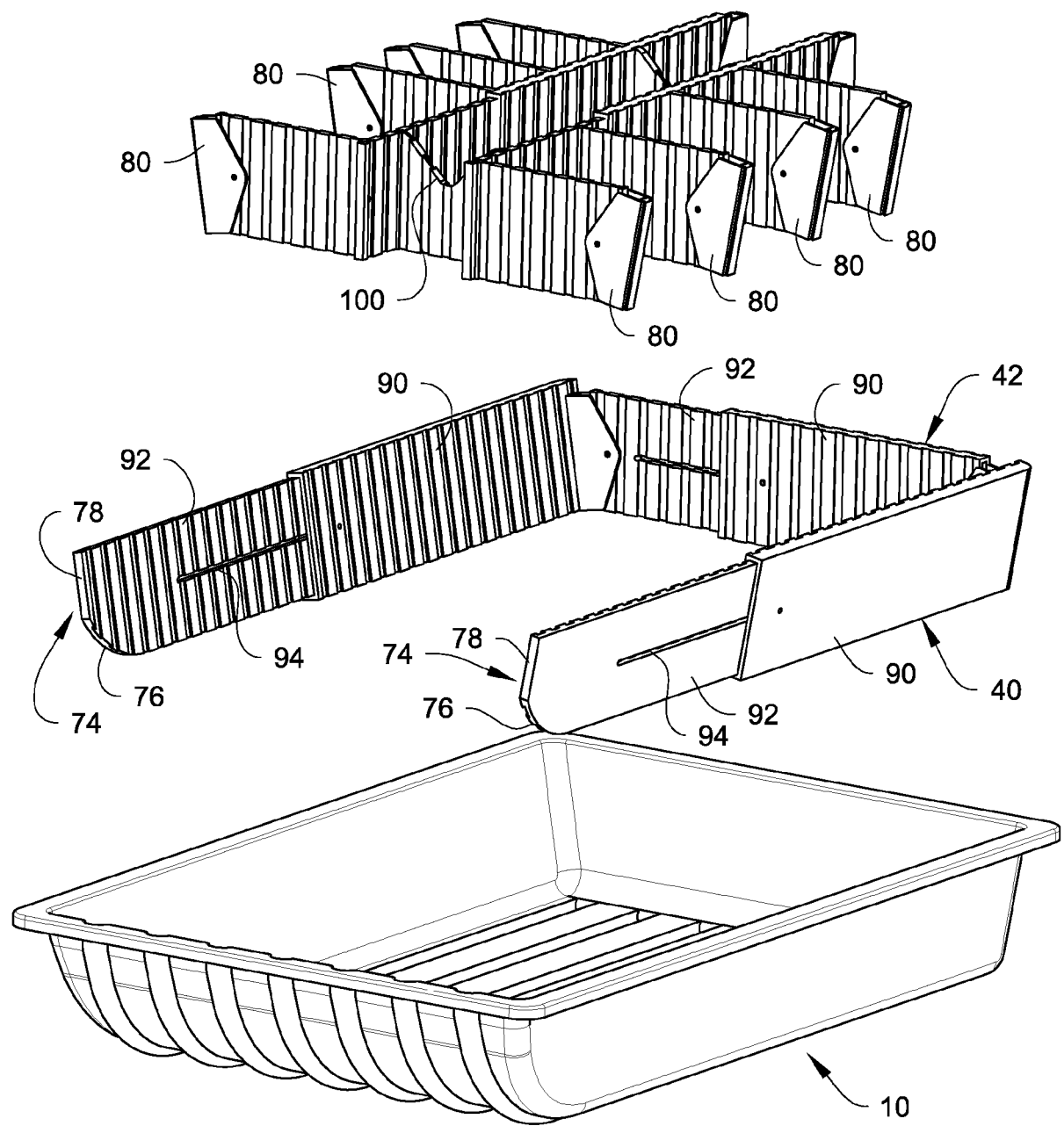
FIG. 7 is another perspective view of the organizer system of FIG. 3 removed from the ice fishing sled.
Figure 8:
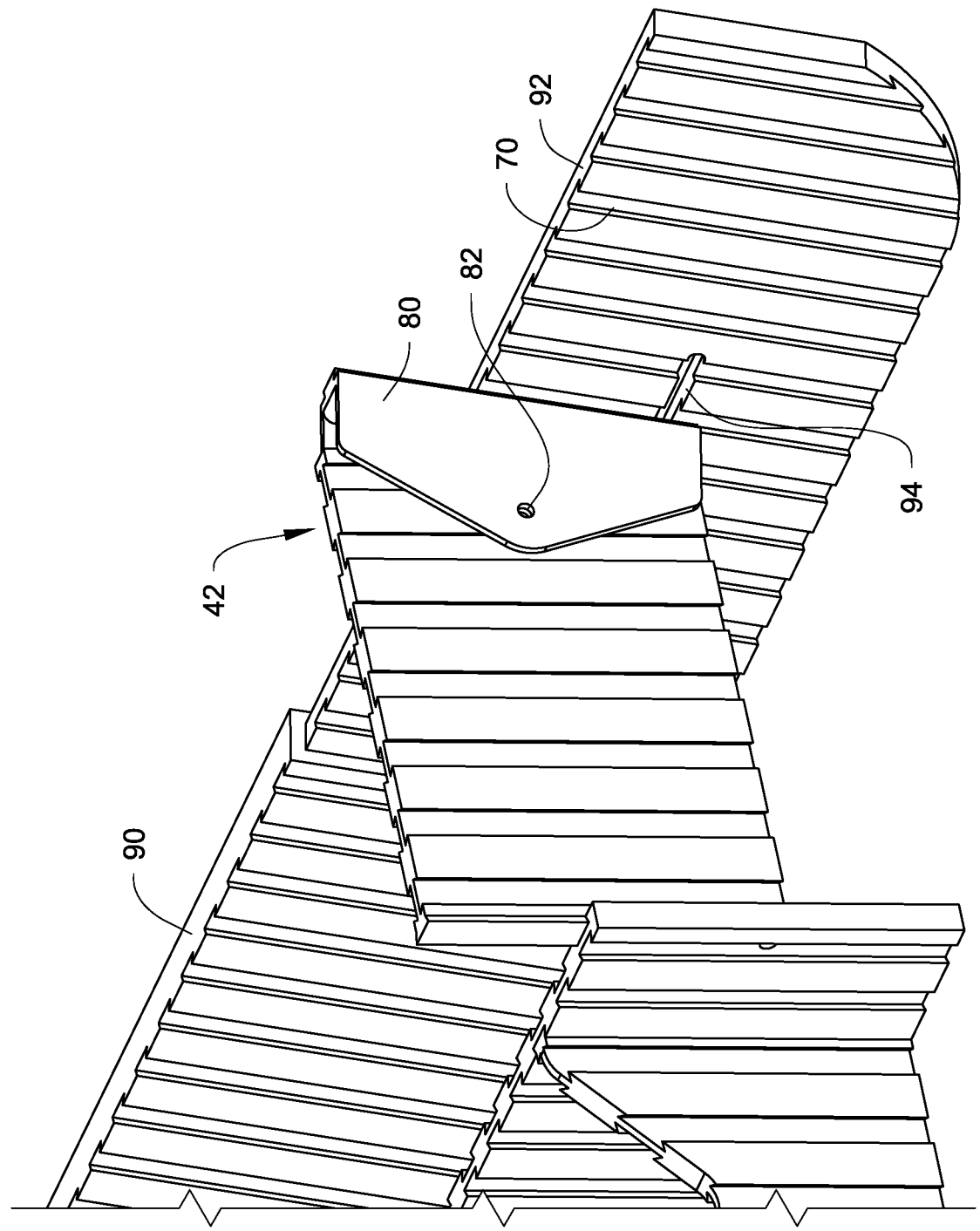
FIG. 8 is a close-up detailed view showing an embodiment of how the panels of the organizer system can releasably engage with one another.
Figure 9:
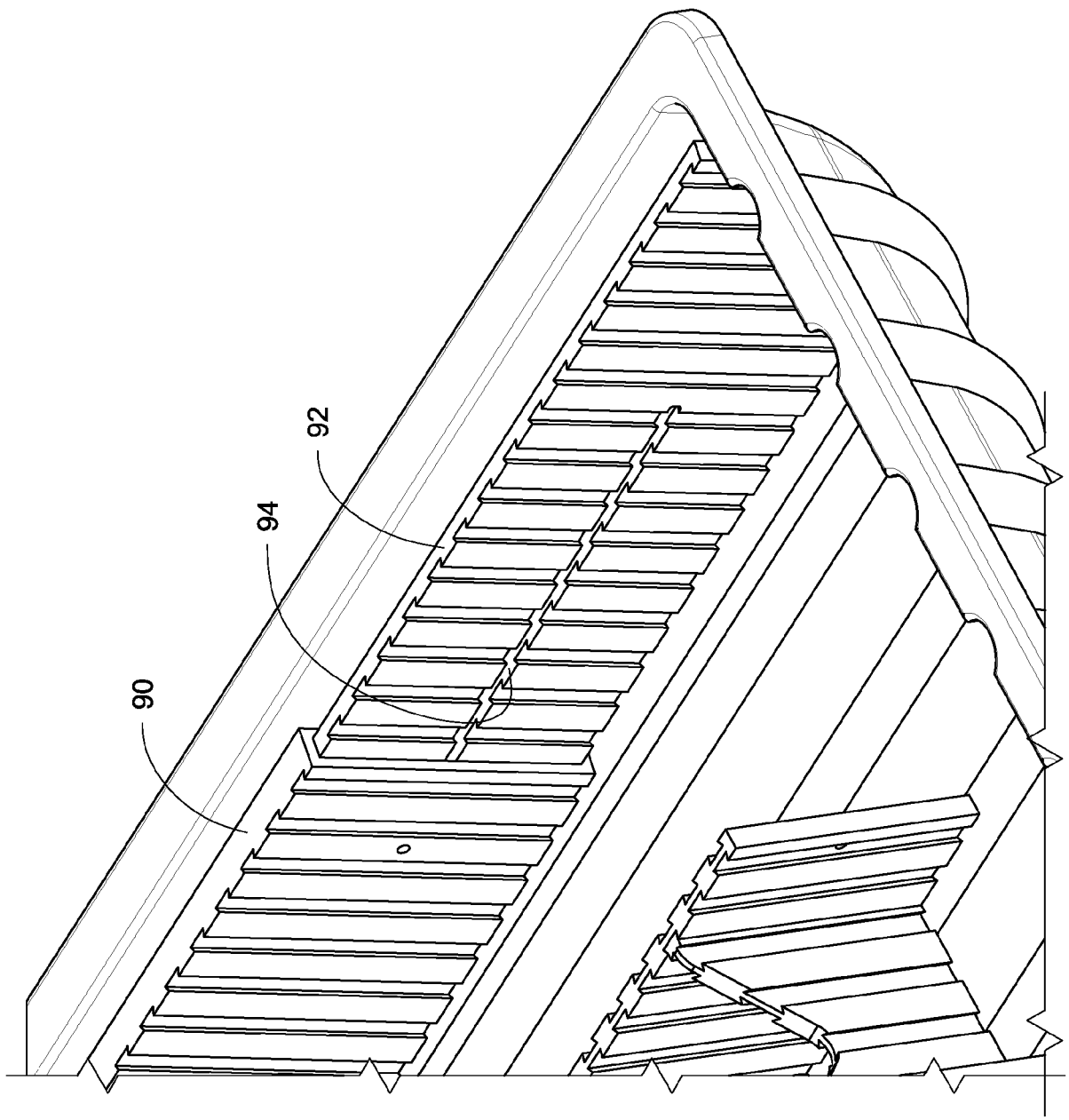
FIG. 9 is a close-up detailed view showing an embodiment of how the panels of the organizer system can be adjusted in length.

FIGS. 3-10 illustrate the sled 10 with another embodiment of the organizer system 12. In this embodiment, there is a different arrangement of the longitudinal divider panels 40 and the lateral divider panels 42. The panels 40, 42 are illustrated with the channels 70 spaced along their length and in some cases, on each side face of the panels 40, 42. As best seen in FIGS. 6-8, ends of certain ones of the panels 40, 42 are provided with an end plate 80. Each end plate 80 is pivotally attached to the end of the panel 40, 42 by a pivot pin 82 to allow each end plate 80 to pivot relative to its corresponding panel 40, 42. In addition, each plate 80 is sized to permit the plate 80 to be slideably received within one of the channels 70. The pivoting of the plates 80 permits each plate to adjust to any angle of the walls 16, 18, 20 or to any angle that the panels 40, 42 may have. It is to be realized that the panels 40, 42 can have any other suitable mechanism to allow the end(s) of the panels 40, 42 to adjust to any angle where they interface with any one of the walls 14, 16, 18, 20 or where they interface with one another.

FIGS. 6 and 7 also illustrate that front ends 74 of the longitudinal panels 40 may be appropriately angled and/or curved to generally match any angle or curvature of the front end wall 14. For example, as illustrated in FIGS. 6 and 7, the front ends 74 may have a curved portion 76 and a portion 78 that can be generally vertical or generally straight/linear.

Some or all of the panels 40, 42 may also be configured to permits the lengths of some or all of the panels to be adjusted. The length adjustment can be achieved using any suitable mechanism that permits the length of the panels 40, 42 to be adjusted. For example, referring to FIGS. 6-7 and 9, the illustrated example shows two of the longitudinal panels 40 as having a first portion 90 and a second portion 92. The first portion 90 is configured to telescopically receive the second portion 92 so that the second portion 92 can slide in and out from the first portion 90. In addition, the second portion 92 is formed with a slot 94 that can extend through the thickness of the second portion 92. A fastener 96, such as a set screw or the like, can extend through the first portion 90 and through the slot 94 of the second portion to lock the desired relative positions of the first and second portions 90, 92 and this releasably fix the length of the panel 40. FIG. 7 also illustrates one of the panels 42 as having the first and second portions 90, 92 to permit length adjustment of the panel 42.

Figure 3:
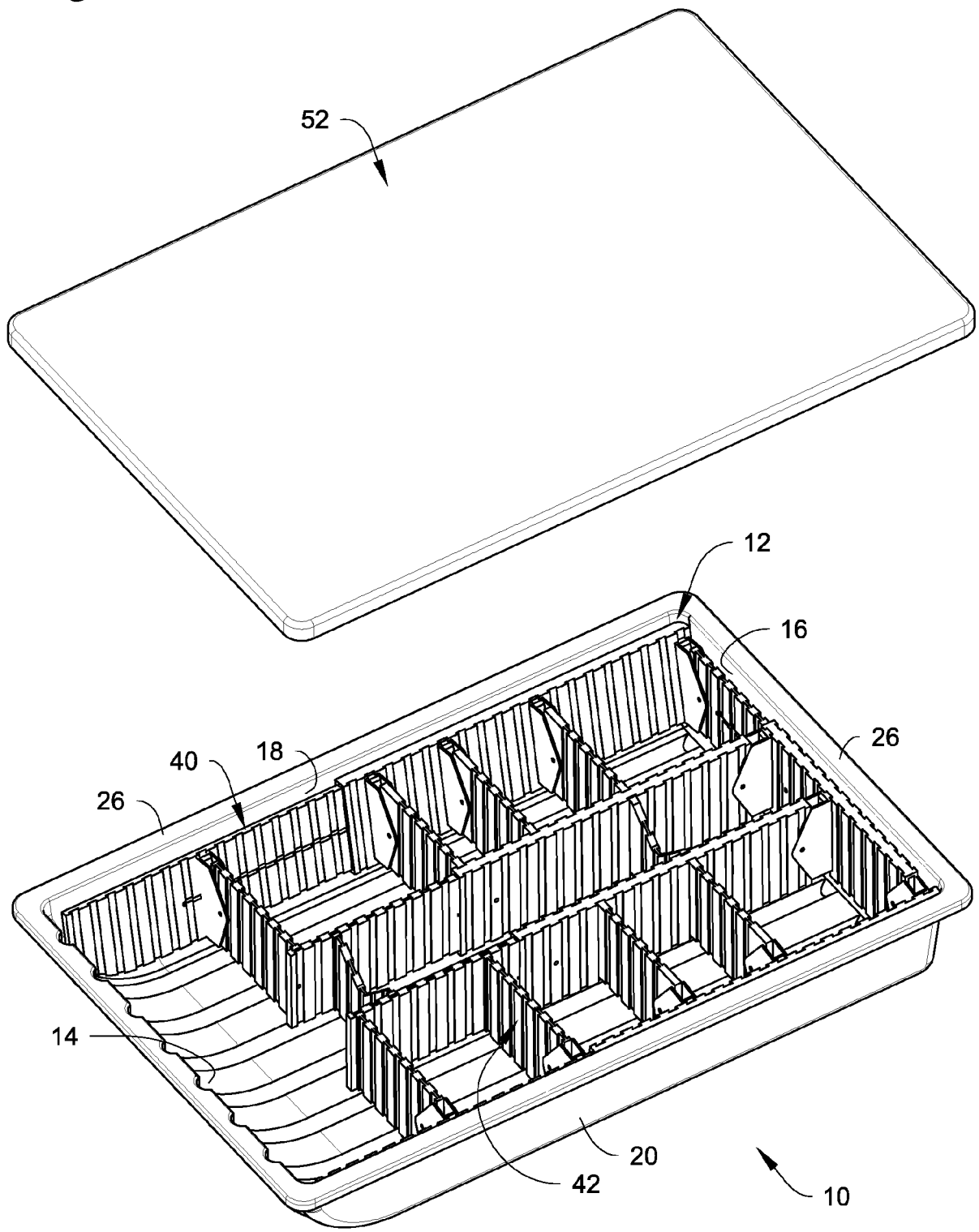
FIG. 3 is a top perspective view of an ice fishing sled with another embodiment of an organizer system described herein along with a lid.

FIGS. 3-5 also illustrate a lid 52 that can be used to close the top of the sled 10. The lid 52 is configured to be movable between an open position and a closed position. FIG. 3 shows the lid 52 in the open position and FIG. 5 shows the lid 52 in the closed position. In the closed position, the lid 52 is located on the top of the sled over interior space 24. The lid 52 is configured to close the interior space 24 of the slid 24 in the closed position. The lid 52 can close the tops of the compartments formed in interior space 24. As shown in FIG. 3, the interior space 24 is open when the lid 52 is in the open position. In some embodiments, the lid 52 can separate entirely from the rest of the sled 10 in the open position. In other embodiments, the lid 52 may be configured to remain attached to the sled 10 when in the open position. In some embodiments, the lid 52 can have one or more intermediate positions between the open position and the closed position.

In this embodiment, rather than the lid being recessed within the sled 10, the lid 52 has a size slightly larger than the sled 10 so that the lid 52 fits over and rests on the lip 26 of the walls 14, 16, 18, 20 as best seen in FIG. 5. The lid 52 is made of any material that is suitable for functioning as a lid including plastic, metal, wood, and/or fabric. The lid 52 in FIGS. 3-5 has a molded plastic body. In some embodiments, the lid 52 can be a flexible fabric lid formed of a fabric, which may be stretchable and/or plastic coated.

In this embodiment, the lid 52 fits to the top of the sled 10 and seals the interior space 24 of the sled 10. The lid 52 is removably attached to at least two of the walls 14, 16, 18, 20. In an embodiment, the lid 52 can attach by snapping into the interior space 24 or over the lip 26 of the walls 14, 16, 18, 20. In some embodiments, the sled 10 and/or the lid 52 may include hook(s), snap(s), tab(s), hook and loop fastener(s) (not shown), etc. for attaching the lid 52. A fabric lid may be attached by being stretching over the lip 26 of the walls 14, 16, 18, 20.

The sealing between the lid 52 and the walls 14, 16, 18, 20 can prevent debris (e.g., snow, dirt, etc.) from entering the interior space 24. The seal is formed by contact between the lid 52 and the walls 14, 16, 18, 20. In FIGS. 3 - 5, the seal is formed by contact between the lid 52 and the lip 26 of the walls 14, 16, 18, 20. In some embodiments, a gasket (not shown) can be provided between the lid 52 and the walls 14, 16, 18, 20 to improve sealing.

Returning to FIG. 2, the divider panels 40, 42 may also be configured to accommodate specific ice fishing equipment. For example, the upper edges 50 of some of the panels 42, such as the panels 42-6, 42-7, may have the aligned concave recesses 60 to accommodate the shaft and/or screw of an ice auger 88A. In addition, some of the divider panels 42, such as the panels 42-6, 42-10, may be formed with through holes 82 to allow passage therethrough of fishing poles 88B to secure the fishing poles in position. FIGS. 6 and 7 show some of the lateral panels 42 as having valleys or concave recesses 100 to accommodate the shaft and/or screw of an ice auger 88A.

The panels 40, 42 of the organizer system 12 in FIG. 2 form a plurality of discrete compartments into which ice fishing equipment can be disposed to thereby neatly arrange, organize, and secured the equipment in the sled 10. Many different configurations are possible. For example, a propane tank 88C can be located in one compartment, a heater 88D can be located in another compartment, a tackle box 88E can be located in one compartment, and miscellaneous equipment such as an ice fishing skimmer 88F and an gaff hook 88G can be located in another compartment.

Figure 11:
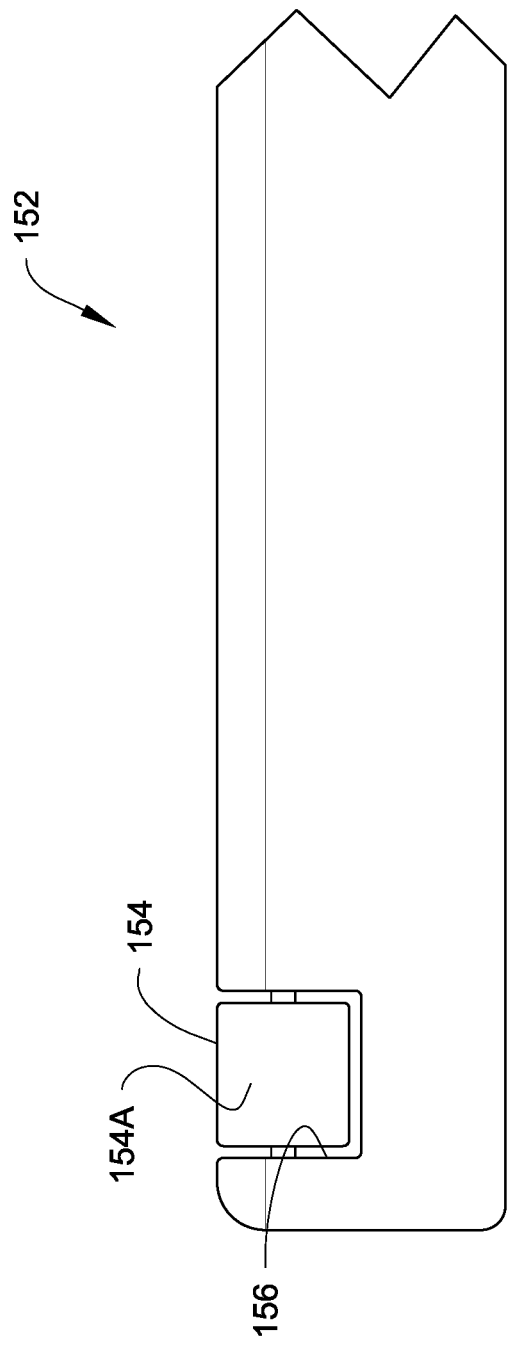
FIG. 11 is a side view of a portion of a lid for an ice fishing container.

FIGS. 11 and 12 illustrate another embodiment of a lid 152 for the sled 10. FIG. 11 is a partial side view of the lid 152. FIG. 12 is a top prospective view of the lid 152. The lid 152 includes a deployable and stowable arm 154. As shown in FIG. 12, the deployable arm 154 (or just arm 154) is moveable between a stored position $P_1$ and a deployed position $P_2$ (shown in dashed lines). The arm 154 pivots via its end 154A to move between the stored position $P_1$ and the deployed positon $P_2$.

In this embodiment, the lid 152 includes a recessed groove 156 for the arm 154 to receive the arm 154 when in the stored position $P_1$. In the stored position $P_1$, the arm 154 is disposed within and extends parallel to the recessed groove 156. In the deployed position $P_2$, the arm 154 extends upwardly from the lid 152, for example vertically from the lid 152. As shown in FIG. 12, the arm 154 can be configured to extend perpendicular to the recess groove 156 when in the deployed position $P_2$. As shown in FIGS. 11 and 12, the entire arm 154 may be configured to be entirely within the recessed groove 156 when in the stored position $P_1$.

The arm 154 can be used to keep gear and/or clothing off the ice, snow, dirt, etc. The arm 154 may include branches 158 that are foldable. The branches 158 can allow for easier hanging of gear and/or clothing (e.g., coat, gloves, etc.) on the arm 154 when deployed.

The lid 152 can also include a measuring ruler 160. The measuring ruler 160 can be formed on or in the top of the lid 152, or the ruler 160 can be a sticker that is adhered to the top of the lid 152. The measuring ruler 160 can be used to, for example, measure fish.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An organizer system for an ice fishing sled having an interior space comprising: a front end wall, a rear end wall, a first side wall extending between the front end wall and the rear end wall, a second side wall extending between the front end wall and the rear end wall, and a bottom wall, the first side wall and the second side wall being angled from vertical, the organizer system comprising:

a plurality of divider panels configured to fit within the interior space of the ice fishing sled, the plurality of divider panels forming compartments configured to accommodate a plurality of ice fishing equipment, the plurality of divider panels including a plurality of longitudinal divider panels, each of the plurality of longitudinal divider panels having a length that extends at least a portion of a length of the first side wall or the second side wall of the ice fishing sled, and a plurality of lateral divider panels, each of the plurality of lateral divider panels having a length that extends at least a portion of a length of the front end wall or the rear end wall of the ice fishing sled, wherein at least two of the plurality of longitudinal divider panels are configured to be in contact with the first side wall and the second side wall of the ice fishing sled and are disposed at an angle complementary to the first side wall and the second side wall, and wherein at least two of the plurality of lateral divider panels extend a width of the interior space and include a lateral end that is angled from vertical that corresponds to the angle of the longitudinal divider panel in contact with the first side wall or the second side wall of the ice fishing sled, each of the at least two of the plurality of lateral divider panels including a concave recess along a top wall thereof, the concave recesses have a size sufficient to receive a shaft or screw of an ice auger, wherein the at least two of the plurality of lateral divider panels are spaced longitudinally from each other to form an ice auger space for receiving the ice auger, and wherein there are no lateral divider panels between the at least two of the plurality of lateral divider panels, wherein the plurality of ice fishing equipment includes a propane tank, a fishing pole, a heater, and a tackle box, and wherein a first compartment of the compartments has a size that is sufficient to receive the heater, a second compartment of the compartments has a size that is sufficient to receive the tackle box, and a third compartment of the compartments has a size that is sufficient to receive the propane tank.

2. The organizer system of claim 1, wherein the lateral end is adjustable to permit change of the angle of the lateral end.

3. The organizer system of claim 1, wherein at least one of the longitudinal divider panels includes a longitudinal end configured to be adjacent the front end wall that has an angle that is complementary to the front end wall of the ice fishing sled, the front end wall of the ice fishing sled being angled relative to vertical from a top edge thereof to a bottom edge thereof that intersects the bottom wall.

4. The organizer system of claim 3, wherein the longitudinal end is adjustable to permit change of the angle of the longitudinal end.

5. The organizer system of claim 1, wherein the plurality of longitudinal divider panels include a plurality of channels configured to removably receive one or more lateral ends of the plurality of lateral divider panels, wherein the plurality of channels are spaced apart from one another.

6. The organizer system of claim 1, wherein at least one of the longitudinal divider panels is configured to be adjustable in length.

7. The organizer system of claim 6, wherein the at least one longitudinal divider panel includes a first portion and a second portion, the first portion telescopically receiving the second portion, and the second portion being configured to move within the first portion to adjust the length of the at least one longitudinal divider panel.

8. An ice fishing sled, comprising:
a front end wall, a rear end wall, a first side wall extending between the front end wall and the rear end wall, a second side wall extending between the front end wall and the rear end wall, and a bottom wall, the first side wall and the second side wall being angled from vertical;
the front end wall, the rear end wall, the first side wall, the second side wall, and the bottom wall define an interior space; and
an organizer system disposed within the interior space, the organizer system including a plurality of divider panels configured to fit within the interior space, the plurality of divider panels forming compartments configured to accommodate a plurality of ice fishing equipment, the plurality of divider panels including a plurality of longitudinal divider panels that are parallel to the first side wall and the second side wall, and a plurality of lateral divider panels that are parallel to the front end wall and the rear end wall,
wherein each of the plurality of longitudinal divider panels having a length that extends at least a portion of a length of the first side wall or the second side wall of the ice fishing sled,
wherein each of the plurality of lateral divider panels having a length that extends at least a portion of a length of the front end wall or the rear end wall of the ice fishing sled, wherein at least two of the plurality of longitudinal divider panels are in contact with the first side wall and the second side wall of the ice fishing sled and are disposed at an angle complementary to the first side wall and the second side wall, and wherein at least two of the plurality of lateral divider panels extend a width of the interior space and include a lateral end that is angled from vertical that corresponds to the angle of the longitudinal divider panel in contact with the first side wall or the second side wall of the ice fishing sled, each of the at least two of the plurality of lateral divider panels including a concave recess along a top wall thereof, the concave recesses have a size sufficient to receive a shaft or screw of an ice auger, wherein the at least two of the plurality of lateral divider panels are spaced longitudinally from each other, the at least two of the plurality of lateral divider panels and two additional ones of the longitudinal divider panels form an ice auger space that accommodates the shaft or screw of the ice auger, the two additional longitudinal divider panels have top edges, and the concave recesses extend below the top edges of the two additional longitudinal divider panels, and wherein there are no lateral divider panels between the at least two of the plurality of lateral divider panels, wherein the plurality of ice fishing equipment includes a propane tank, a fishing pole, a heater, and a tackle box, wherein a first compartment of the compartments has a size that is sufficient to receive the heater, a second compartment of the compartments has a size that is sufficient to receive the tackle box, and a third compartment of the compartments has a size that is sufficient to receive the propane tank.

9. The ice fishing sled of claim 8, further comprising:
a lid that connects to the ice fishing sled so as to close a top thereof.

10. The ice fishing sled of claim 9, wherein the lid is configured to seal the interior space.

11. The ice fishing sled of claim 9, wherein the plurality of divider panels have upper edges, and the lid rests on the upper edges of the plurality of divider panels.

12. The ice fishing sled of claim 9, wherein the lid includes a deployable arm attached thereto that is moveable relative to the lid between a stored position and a deployed position.

13. The ice fishing sled of claim 8, wherein at least one of the longitudinal divider panels includes a longitudinal end that is angled from vertical.

14. The ice fishing sled of claim 13, wherein the lateral end is adjustable to permit change of the angle of the lateral end, and the longitudinal end is adjustable to permit change of the angle of the longitudinal end.

15. The ice fishing sled of claim 8, wherein the angled lateral end of the at least one of the plurality of lateral divider panels is linear from a bottom end to a top end.

16. The ice fishing sled of claim 8, wherein the concave recesses are aligned with one another along an alignment axis that is parallel to a longitudinal axis of the ice fishing sled.

17. The ice fishing sled of claim 16, wherein the alignment axis is offset from the longitudinal axis.

18. The ice fishing sled of claim 16, wherein the alignment axis is coincident with the longitudinal axis.

19. The ice fishing sled of claim 16, wherein the at least two of the plurality of lateral divider panels are adjustable in length such that the alignment axis is adjustable by adjusting the length of the at least two of the plurality of lateral divider panels.

* * * * *